United States Patent [19]

Needles

[11] Patent Number: 4,878,058
[45] Date of Patent: Oct. 31, 1989

[54] MULTI-PROTOCOL DATA CONVERSION
[75] Inventor: William M. Needles, Arlington, Tex.
[73] Assignee: National Semiconductor Corporation, Santa Clara, Calif.
[21] Appl. No.: 206,504
[22] Filed: Jun. 14, 1988
[51] Int. Cl.[4] ............................................. H03M 1/36
[52] U.S. Cl. ...................................... 341/101; 341/63
[58] Field of Search .................................. 341/101, 63
[56] References Cited
U.S. PATENT DOCUMENTS
4,794,627  12/1988  Grimaldi ............................ 341/101

Primary Examiner—William M. Shoop, Jr.
Assistant Examiner—Helen Kim
Attorney, Agent, or Firm—Limbach, Limbach & Sutton

[57] ABSTRACT

A transmit circuit provides for multi-protocol operation without the need for two distinct transmitter units. This is accomplished by providing a transfer gate multiplexer at the data input to a shift register under transmitter control. Each of the elements of the multiplexer receives as inputs both a data bit from the normal bit sequence and a juxtaposed data bit from a corresponding bit sequence that has been "flipped" end-for-end. Steering logic then selects which of the two protocols will be provided to the shift register for transmission.

5 Claims, 2 Drawing Sheets

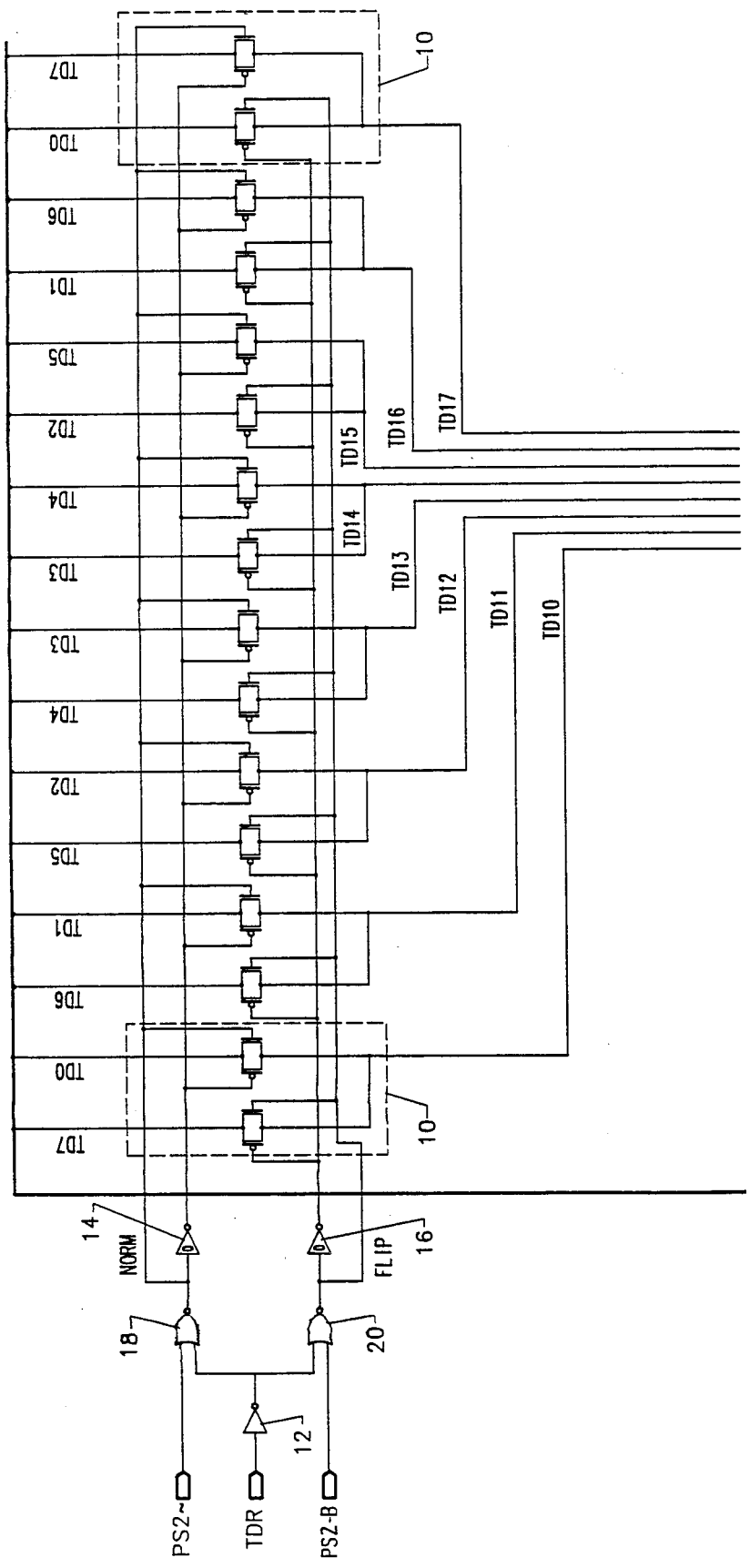

MULTI-PROTOCOL DATA CONVERSION

BACKGROUND OF THE INVENTION

Different computer systems may process information utilizing different data formats. In the most typical case, the computer receives data, for example an 8-bit data word $A_0$-$A_7$, in serial format with bit $A_0$ being received first, followed in sequence by bits $A_1$ through $A_7$. Computer systems are available, however, that receive the data $A_0$-$A_7$ in a reverse or "flipped" format. That is, bit $A_7$ is received first, followed in sequence by bits $A_6$ through $A_0$. For example, IBM 5250 systems utilize the former protocol wherein data is received in the $A_0$-$A_7$ sequential format. On the other hand, IBM 3270/3299 systems utilize the latter "flipped" protocol wherein data is received in the $A_7$-$A_0$ sequential format.

Thus, if a single transmitter architecture is to be used for transmitting data bytes to both normal and "flipped" protocol systems, then the transmitter must have the internal capability to "flip" the data end for end.

To accomplish this, the present invention provides a transfer gate two-to-one multiplexer at the data input to a shift register under transmitter control. This allows for multi-protocol transmitter operation without the need for two distinct transmitter units.

Previously, this type of operational capability required multiple chip solutions. However, the system time constraints for multi-function, high speed applications require the innovative approach provided by the present invention.

DESCRIPTION OF THE DRAWINGS

FIGS. 1A and 1B combine to provide a schematic diagram illustrating a transmit circuit that includes means for multi-protocol data conversion in accordance with the present invention.

DETAILED DESCRIPTION OF THE INVENTION

Figure 1B:
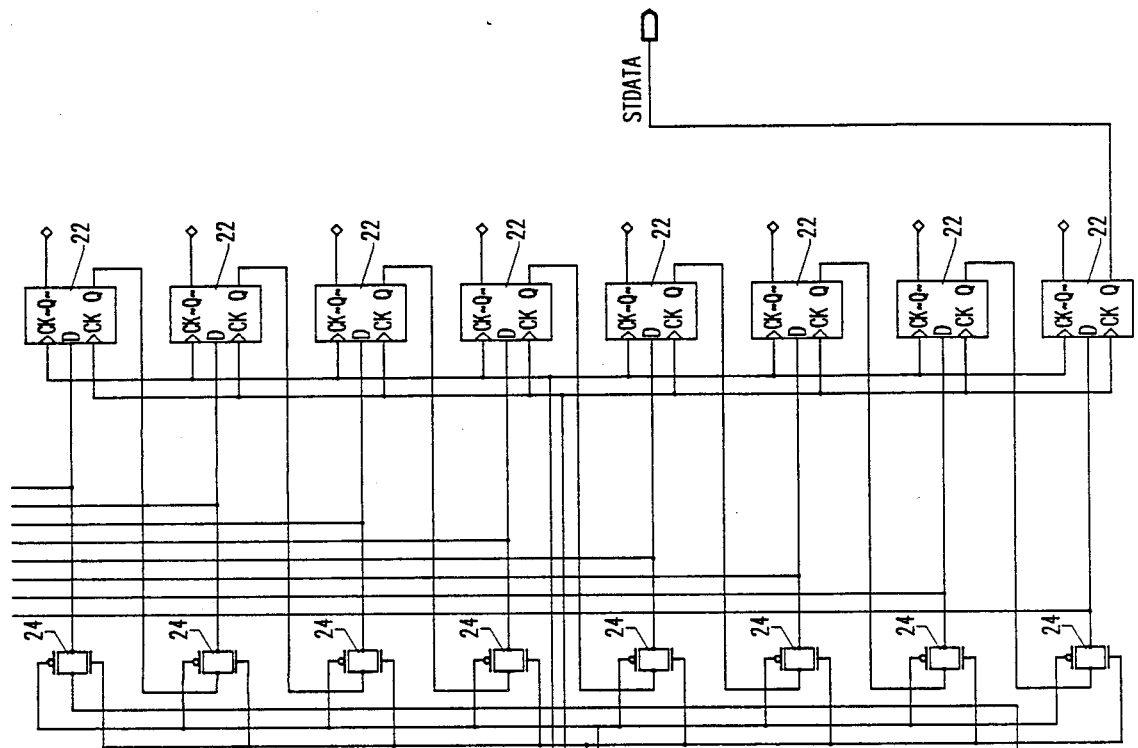
Figure 1B:
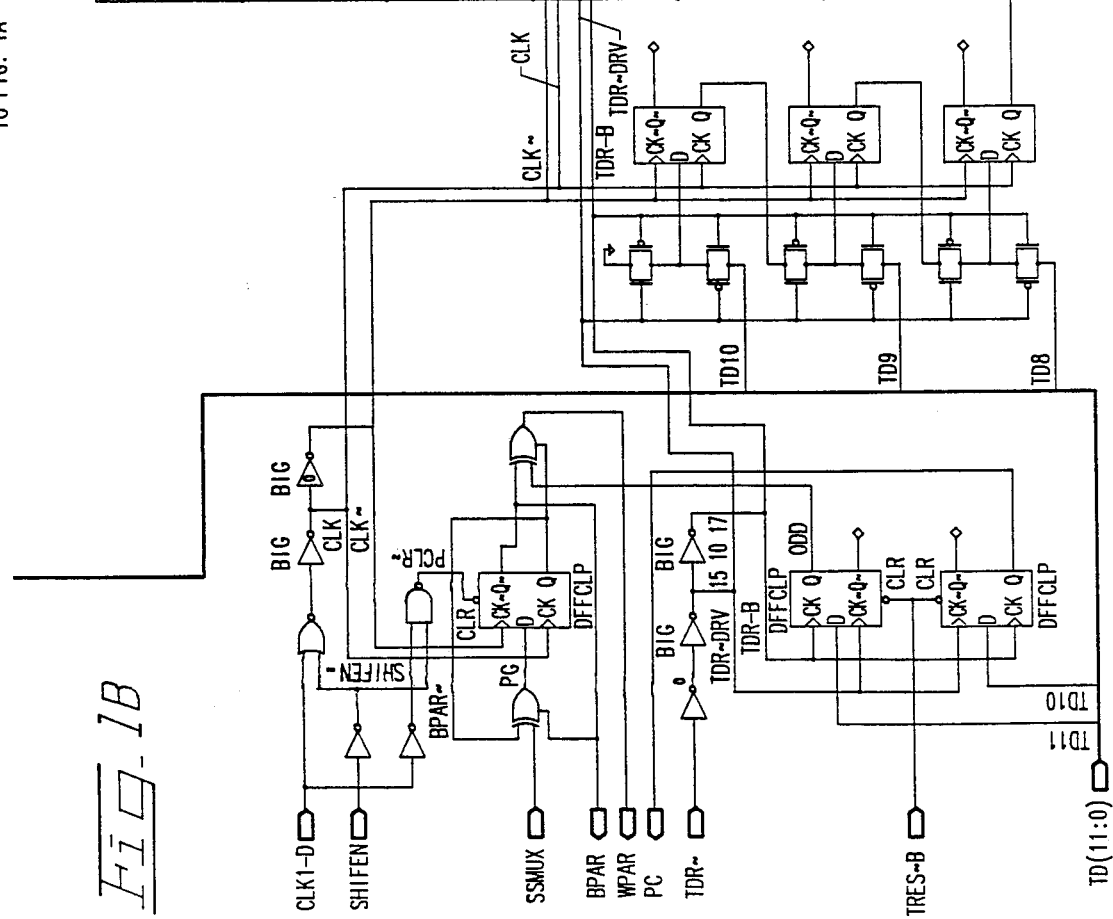

FIGS. 1A and 1B combine to show a transmit circuit which receives 8 bit data words TD0-TD7 in parallel format. A collection of eight two-to-one multiplexors 10, a typical example of which is enclosed by dashed lines in FIG. 1A, combine to form circuitry for flipping the data TD0-TD7 in accordance with the present invention.

Each two-to-one multiplexer 10 has as its inputs both a TD input bit signal and its corresponding match in an end-for-end flipped version of the data word. That is, the multiplexer 10 at the left hand side of the series of multiplexers shown in FIG. 1A, receives input bit TD7 juxtaposed with input bit TD0, the adjacent multiplexer to the right receives bit TD6 juxtaposed with bit TD1, and so on until each of the eight bits has been positioned. Thus, each of the eight multiplexers 10 receives as inputs both a data bit from the "normal" bit sequence TD0-TD7 and a corresponding juxtaposed data bit from the "flipped" bit sequence TD7-TD0.

The outputs of the eight two-to-one multiplexers are identified in FIG. 1A as TDI0 through TDI7 and carry the input data words TD0-TD7 in its protocol specific format. That is, the outputs TDI0-TDI7 may correspond either to the normal bit sequence TD0-TD7 or to the slipped bit sequence TD7-TD0.

As further shown in FIG. 1A, actual protocol selection is controlled by steering logic, consisting of inverters 12, 14 and 16 and NOR gates 18 and 20, which decodes the signals TDR, PS2-B (a buffered version of PS2) and $\overline{PS2}$ (the complement of PS2) per Table I below to generate NORM and FLIP control signals for the eight multiplexors 10:

TABLE I

| PS2-B | TDR | NORM | FLIP |
|---|---|---|---|
| 0 | 1 | 0 | 1 |
| 0 | 0 | 0 | 0 |
| 1 | 1 | 1 | 0 |
| 1 | 0 | 0 | 0 |

The three signals TDR, PS2-B and $\overline{PS2}$ are generated under the control of and are timed by a transmitter state machine (not shown) which generates the three signals based on user-selected protocol inputs.

As stated above, the NORM and FLIP signals generated by the steering logic control the two-to-one multiplexers 10 that form the byte flip circuit. When NORM is active, 5250-type and general-purpose eight bit data word formatting is selected. When FLIP is active, the flipped 3270/3299-type data word formatting is selected. At all other times, the byte inversion circuit is inactive.

As illustrated in FIG. 1B, the outputs TDI0-TDI7 of the two-to-one multiplexers 10 are provided to an output register consisting of a series of D-type flip-flops 22 which serially transmit the 8 bits of the protocol-formatted data word at the register output STDATA.

The timing for the parallel loading of the flip-flops 22 and the serial transmission of data via the STDATA output is provided by conventional parallel input/serial output (PISO) control logic. That is, as shown in FIG. 1B, when the TDR-DRV signal is active and the TDR-B signal is inactive, then transfer gates 24 are disabled and data may be clocked into flip-flops 22 from the TDI0-TDI7 bus. Conversely, when TDR-B is active and TDR-DRV is inactive, the transfer gates are enabled allowing serial shifting of data via the STDATA output. The inputs to the PISO control logic are provided by the transmitter state machine.

FIG. 1B also shows parity generator circuitry which is implemented in conjunction with the transmitter design.

Essentially, as described above, the multi-protocol conversion circuit of the present invention provides three discrete functions. First, it can pass data words TD0-TD7 directly from the CPU unadulterated. Second, it can flip the data words TD0-TD7 end for end as received from the CPU. Third, it can completely disable the data path from the CPU for shift operations.

It should be understood that the invention is not intended to be limited by the specifics of the above-described embodiment, but rather defined by the accompanying claims.

What is claimed is:

1. In a transmit circuit of the type that receives multiple bit input data having a first bit sequence in parallel format and includes means for transmitting the multiple bits in serial format according to the first bit sequence, the improvement comprising circuitry for reordering the first bit sequence to a second bit sequence and means for transmitting the multiple bits of the input data in serial format according to the second bit sequence.

2. In a transmit circuit of the type that receives multiple bit input data in parallel format having a normal bit sequence and includes means for transmitting the multiple bits in serial format according to the normal bit sequence, the improvement comprising circuitry for flipping the normal bit sequence such that the multiple bits of the input data may be transmitted in serial format according to the flipped bit sequence.

3. Circuitry for reordering the sequence of a plurality of data bits having a first big sequence, the circuitry comprising:
   (a) means comprising a plurality of two-to-one multiplexers corresponding to the plurality of data bits, each of the multiplexers receiving as inputs both a data bit from the first bit sequence and a corresponding data bit from a second bit sequence; and
   (b) steering means for selecting as output data of the multiplexer means either data having the first bit sequence or data having the second bit sequence.

4. A data conversion circuit for flipping the sequence of a plurality of data bits having a normal bit sequence, the circuit comprising:
   (a) flipping means comprising a plurality of two-to-one multiplexers corresponding to the plurality of data bits, each of the multiplexers receiving as inputs both a data bit from the normal bit sequence and a juxtaposed data bit from a corresponding flipped bit sequence; and
   (b) steering means for selecting as output data of the flipping means either data having the normal bit sequence or data having the flipped bit sequence.

5. A transmit circuit for transmitting data words received from a central processing unit, the transmit circuit comprising:
   (a) a data conversion circuit for flipping the sequence of a plurality of data bits having a normal bit sequence, the data conversion circuit comprising
      (i) flipping means comprising a plurality of two-to-one multiplexers corresponding to the plurality of data bits, each of the multiplexers receiving as inputs both the data bit from the normal bit sequence and a juxtaposed data bit from corresponding flipped bit sequence; and
      (ii) steering means for selecting as output data of the conversion means either data having the normal bit sequence or data having the flipped bit sequence;
   (b) a shift register for receiving the output data of the conversion means and transmitting the output data in serial format; and
   (c) control means for controlling the serial transmission of the output data by the shift register in response to instructions from the central processing unit.

* * * * *